United States Patent
Szigeti et al.

(10) Patent No.: US 12,452,283 B2
(45) Date of Patent: Oct. 21, 2025

(54) DYNAMIC AND TRANSPARENT APPLICATION PROGRAM INTERFACE (API) ENDPOINT HOST REDIRECTION

(71) Applicant: Cisco Technology, Inc., San Jose, CA (US)

(72) Inventors: Thomas Szigeti, Vancouver (CA); David John Zacks, Vancouver (CA); Ted Hulick, Pearland, TX (US)

(73) Assignee: Cisco Technology, Inc., San Jose, CA (US)

( * ) Notice: Subject to any disclaimer, the term of this patent is extended or adjusted under 35 U.S.C. 154(b) by 215 days.

(21) Appl. No.: 18/328,530

(22) Filed: Jun. 2, 2023

(65) Prior Publication Data
US 2024/0406205 A1  Dec. 5, 2024

(51) Int. Cl.
*H04L 9/40* (2022.01)

(52) U.S. Cl.
CPC ...... *H04L 63/1433* (2013.01); *H04L 63/1416* (2013.01); *H04L 63/30* (2013.01)

(58) Field of Classification Search
CPC ....... H04L 63/12; H04L 63/126; H04L 63/14; H04L 63/1408; H04L 63/1433; H04L 63/145; H04L 63/1466; H04L 63/1475; H04L 63/1483
See application file for complete search history.

(56) References Cited

U.S. PATENT DOCUMENTS

| | | | |
|---|---|---|---|
| 7,849,502 B1 * | 12/2010 | Bloch | H04L 43/00 726/22 |
| 8,087,082 B2 * | 12/2011 | Bloch | H04L 61/4511 726/22 |
| 8,347,394 B1 | 1/2013 | Lee | |
| 9,660,870 B1 * | 5/2017 | Kuhr | G06F 9/45512 |
| 10,362,057 B1 * | 7/2019 | Wu | H04L 63/1408 |
| 10,382,484 B2 * | 8/2019 | Shayevitz | G06F 21/56 |
| 10,917,317 B2 * | 2/2021 | Stammers | H04L 41/5054 |
| 11,283,763 B2 * | 3/2022 | Rudnik | H04L 61/5007 |

(Continued)

OTHER PUBLICATIONS

Bitsight, "Identify, Quantify, and Reduce Cyber Risk," downloaded from https://www.bitsight.com/ on Apr. 3, 2023.

(Continued)

*Primary Examiner* — Hosuk Song
(74) *Attorney, Agent, or Firm* — Lee & Hayes, P.C.

(57) ABSTRACT

A method of application program interface (API) endpoint host redirection may include with an intelligent domain name system (DNS) engine (IDE) associated with a containerized service within a pod of a mesh network, snooping a DNS query from the containerized service, identifying within the DNS query, an API endpoint name, snooping a DNS response associated with the DNS query, identifying an Internet protocol (IP) address associated with the API endpoint name, transmitting the API endpoint name and the IP address to a controller, receiving, from the controller, a list of safe API endpoint hosts with no known security vulnerabilities based on security data obtained from at least one security service, caching, at the IDE, the list of safe API endpoint hosts including safe IP addresses, and transmitting to the containerized service, via the IDE, IP addresses of safe API endpoint hosts within the list of safe API endpoint hosts.

20 Claims, 12 Drawing Sheets

(56) References Cited

U.S. PATENT DOCUMENTS

| | | | | |
|---|---|---|---|---|
| 11,923,995 | B2* | 3/2024 | Raleigh | H04L 12/1492 |
| 11,949,656 | B2* | 4/2024 | Sole | H04L 63/0236 |
| 11,968,302 | B1* | 4/2024 | Kumar | H04W 12/73 |
| 12,166,596 | B2* | 12/2024 | Raleigh | H04W 28/0257 |
| 2016/0044054 | A1 | 2/2016 | Stiansen et al. | |
| 2016/0373409 | A1 | 12/2016 | Zhu et al. | |
| 2022/0239696 | A1 | 7/2022 | Konda et al. | |
| 2022/0321596 | A1 | 10/2022 | Weizman et al. | |

OTHER PUBLICATIONS

Istio, "Simplify observability, traffic management, security, and policy with the leading service mesh," downloaded from https://istio.io/ on Apr. 3, 2023.

Noname, "The Complete API Security Platform," downloaded from https://nonamesecurity.com/ on Apr. 3, 2023.

Novikov, "How To Address Growing API Security Vulnerabilities In 2022," published online on Jul. 25, 2022.

Panoptica, "Simplified Cloud-Native Application Security for DevSecOps, Platform," and DevOps teams, downloaded from https://www.panoptica.app/ on Apr. 3, 2023.

Salt Security, "Securing Your Innovation: The rich API context you need for robust discovery, attack prevention, and shift left," downloaded from https://salt.security/ on Apr. 3, 2023.

Traceable, "Intelligent API Security at Enterprise Scale," downloaded from https://www.traceable.ai/ on Apr. 3, 2023.

* cited by examiner

DYNAMIC AND TRANSPARENT APPLICATION PROGRAM INTERFACE (API) ENDPOINT HOST REDIRECTION

TECHNICAL FIELD

The present disclosure relates generally to network security. Specifically, the present disclosure relates to systems and methods for application program interface (API) security through API endpoint host redirection.

BACKGROUND

Network security is a growing industry with the ubiquity of computing devices and networks throughout the world. Among the number of types of attacks that may compromise a computing network, application program interface (API) attacks have become a very frequent attack method. APIs provide seamless communication between various applications and systems. However, the growing use of APIs across all facets of business also brings with it a significant increase in the attack surface. An API attack is the malicious usage or attempted usage of an API from automated threats such as access violations, bot attacks or abuse and may include specific subcategories of attacks such as, for example, denial of service (DOS) attacks, distributed denial of service (DDOS) attacks, injection attacks, authentication hijacking, cross-sie scripting (XSS) attacks, parameter tampering attacks, man-in-the-middle (MitM) attacks, credential stuffing attacks, application abuse attacks, and server-side request forgery (SSRF) attacks, among others. An API attack may result in mass data losses, stolen private information and service disruption.

Thus, providing API security has become a top of mind concern for individuals and entities. A number of network security providers have developed API security solutions, leveraging deep-packet inspection capabilities provided by a service mesh and identifying the APIs in use within an organization. Further, these network security providers may utilize a number of resources to provide security insights and risk-ratings of APIs and specific API endpoint hosts. For example, some network security providers are able to identify that an external API is in use, with, for example, five known API endpoint hosts; three of which have known vulnerabilities at the application layer, the system layer, or at the network layer. Use of the three API endpoint hosts known to have these vulnerabilities may prove to be a significant risk to a computer network. The remaining two API endpoint hosts, however, may have no known vulnerabilities, and utilization of these two API endpoint hosts may be considered safe.

These network security providers may further be configured to enforce a number of policies within the computer network based on the risk ratings of the various APIs or API endpoint hosts. For example, the network security providers may provide a policy that is set to trigger an alert if an API endpoint host with vulnerabilities was in use within a cloud native environment of an organization. Alternatively, for added protection, a policy may even be configured to block a connection to an API endpoint host with known vulnerabilities. While these policy options serve to protect the organization and its computer network, they do so at the direct cost of maintaining application availability since blocking a connection to an API endpoint host as required under the policy may result in denying use of the application.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
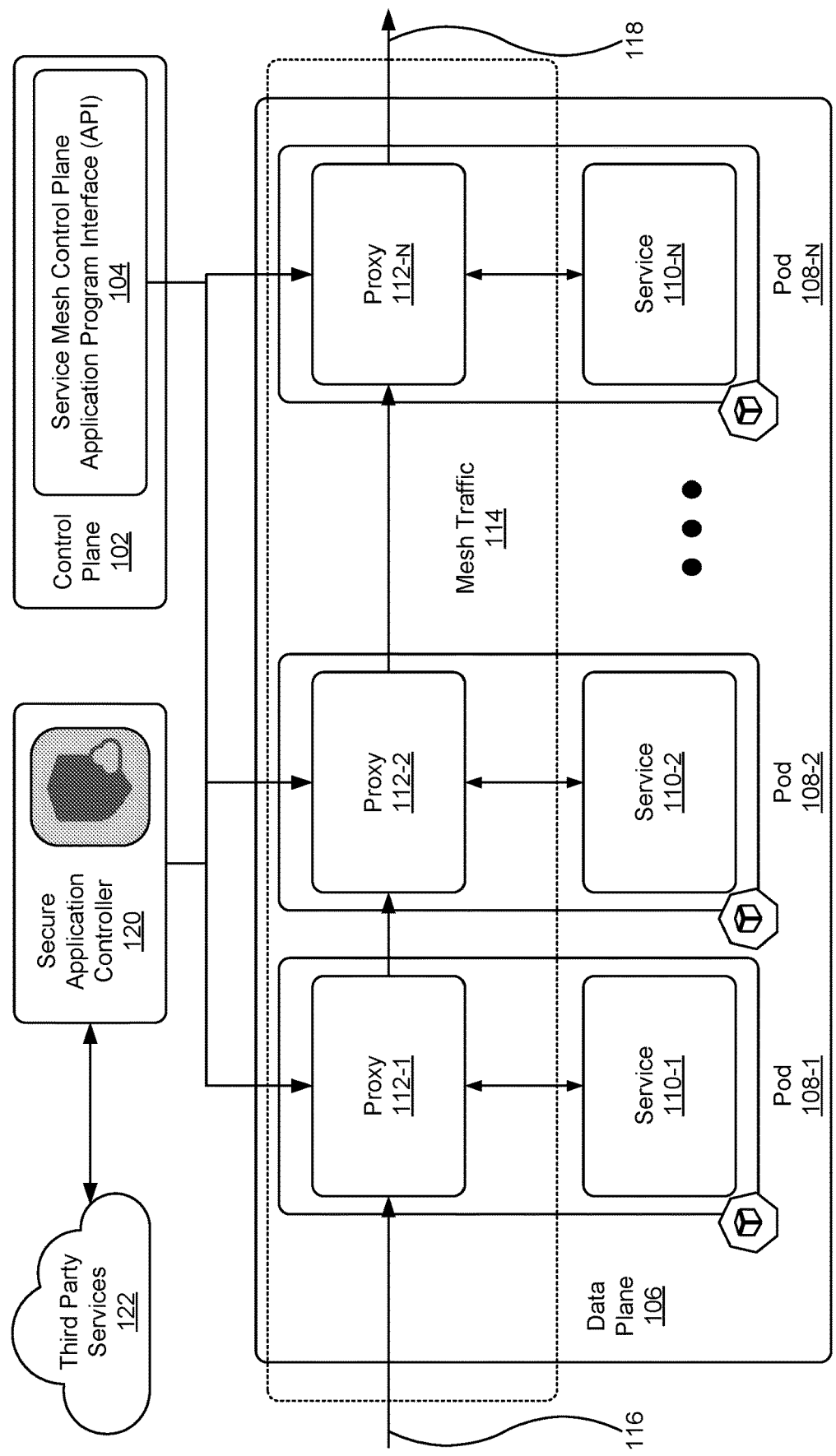
FIG. 1 illustrates a system-architecture diagram of a network that utilizes an intelligent domain name system (DNS) engine (IDE) for application program interface (API) endpoint host redirection, according to an example of the principles described herein.

This disclosure describes methods and systems for transparently redirecting application program interface (API) calls from one API host endpoint that may be determined to be a security risk to another API endpoint host determined to be relatively safer. Current API security systems allow for API calls to risky or API endpoints to either trigger alerts to block connections; however, this has a negative impact on application availability. Therefore, a system is presented to transparently and dynamically steer external API calls away from "risky" API endpoints (e.g., API endpoint hosts which have known vulnerabilities) and toward "safe" API endpoints (e.g., API endpoint hosts which have no known vulnerabilities or an acceptable level of vulnerability). The present systems and methods achieve these ends by intelligently manipulating DNS queries and replies within the application service mesh. In this way, not only is the application protected from API exploits and attacks, but application availability is maintained.

Examples described herein provide a non-transitory computer-readable medium storing instructions that, when executed, causes a processor to perform operations. The operations may include with an intelligent domain name system (DNS) engine (IDE) associated with a containerized service within a pod of a mesh network, snooping a DNS query from the containerized service, and identifying within the DNS query, an application program interface (API) endpoint name. The operations may further include snooping a DNS response associated with the DNS query and identifying an Internet protocol (IP) address associated with the API endpoint name. The operations may further include transmitting the API endpoint name and the IP address to a controller, and receiving, from the controller, a list of safe API endpoint hosts with no known security vulnerabilities based on security data obtained from at least one security service. The operations may further include caching, at the IDE, the list of safe API endpoint hosts including safe IP addresses, intercepting a subsequent DNS request from the containerized service, and transmitting to the containerized service, via the IDE, IP addresses of safe API endpoint hosts within the list of safe API endpoint hosts.

The operations may further include reducing a default time-to-live (TTL) value of the DNS response to a minimum TTL value and assigning the safe API endpoint hosts to a moderate TTL value less than the default TTL value and relatively higher than the minimum TTL value. The moderate TTL value is based at least in part on a security risk of the safe API endpoint hosts being above a threshold.

The operations may further include determining if the security risk of the API endpoint host has changed and assigning a subsequent DNS query from the containerized service to the minimum TTL value based at least in part on the security risk of the API endpoint host having changed. Determining if the security risk of the API endpoint host has changed may include receiving, from the controller, an updated risk assessment from the at least one security service, and updating, at the IDE, at least one entry of the list of safe API endpoint hosts to reflect the updated risk assessment.

The operations may further include swapping a destination IP address within a first IP packet header associated with the subsequent DNS request to a first API endpoint host with a second IP address within the list of safe API endpoint hosts including the safe IP addresses. The operations may further include swapping a source IP address within a returning IP packet header with the second IP address.

The containerized service may include a containerized application microservice within a Kubernetes pod. The at least one security service may include a security threat intelligence service, a DNS resolution service, a DNS lookup service, a phishing protection service, a content filtering service, a cloud computing security service, a security rating service, and combinations thereof.

Examples described herein also provide a method of application program interface (API) endpoint host redirection. The method may include, with an intelligent domain name system (DNS) engine (IDE) associated with a containerized service within a pod of a mesh network, snooping a DNS query from the containerized service, and identifying within the DNS query, an API endpoint name. The method may further include snooping a DNS response associated with the DNS query and identifying an Internet protocol (IP) address associated with the API endpoint name. The method may further include transmitting the API endpoint name and the IP address to a controller, and receiving, from the controller, a list of safe API endpoint hosts with no known security vulnerabilities based on security data obtained from at least one security service. The method may further include caching, at the IDE, the list of safe API endpoint hosts including safe IP addresses, intercepting a subsequent DNS request from the containerized service, and transmitting to the containerized service, via the IDE, IP addresses of safe API endpoint hosts within the list of safe API endpoint hosts.

The method may further include reducing a default time-to-live (TTL) value of the DNS response to a minimum TTL value and assigning the safe API endpoint hosts to a moderate TTL value less than the default TTL value and relatively higher than the minimum TTL value. The moderate TTL value is based at least in part on a security risk of the safe API endpoint hosts being above a threshold.

The method may further include determining if the security risk of the API endpoint host has changed and assigning a subsequent DNS query from the containerized service to the minimum TTL value based at least in part on the security risk of the API endpoint host having changed. Determining if the security risk of the API endpoint host has changed may include receiving, from the controller, an updated risk assessment from the at least one security service, and updating, at the IDE, at least one entry of the list of safe API endpoint hosts to reflect the updated risk assessment.

The method may further include swapping a destination IP address within a first IP packet header associated with the subsequent DNS request to a first API endpoint host with a second IP address within the list of safe API endpoint hosts including the safe IP addresses and swapping a source IP address within a returning IP packet header with the second IP address.

The containerized service is a containerized application microservice within a Kubernetes pod. The at least one security service may include a security threat intelligence service, a DNS resolution service, a DNS lookup service, a phishing protection service, a content filtering service, a cloud computing security service, a security rating service, and combinations thereof.

Examples described herein also provide a system including a processor, and a non-transitory computer-readable media storing instructions that, when executed by the processor, causes the processor to perform operations. The operations may include, with an intelligent domain name system (DNS) engine (IDE) associated with a containerized service within a pod of a mesh network, snooping a DNS query from the containerized service, and identifying within the DNS query, an API endpoint name. The operations may further include snooping a DNS response associated with the DNS query and identifying an Internet protocol (IP) address associated with the API endpoint name. The operations may further include transmitting the API endpoint name and the IP address to a controller, and receiving, from the controller, a list of safe API endpoint hosts with no known security vulnerabilities based on security data obtained from at least one security service. The operations may further include caching, at the IDE, the list of safe API endpoint hosts including safe IP addresses, intercepting a subsequent DNS request from the containerized service, and transmitting to the containerized service, via the IDE, IP addresses of safe API endpoint hosts within the list of safe API endpoint hosts.

The operations may further include reducing a default time-to-live (TTL) value of the DNS response to a minimum TTL value and assigning the safe API endpoint hosts to a moderate TTL value less than the default TTL value and relatively higher than the minimum TTL value. The moderate TTL value is based at least in part on a security risk of the safe API endpoint hosts being above a threshold.

The operations may further include determining if the security risk of the API endpoint host has changed and assigning a subsequent DNS query from the containerized service to the minimum TTL value based at least in part on the security risk of the API endpoint host having changed.

Determining if the security risk of the API endpoint host has changed may include receiving, from the controller, an updated risk assessment from the at least one security service, and updating, at the IDE, at least one entry of the list of safe API endpoint hosts to reflect the updated risk assessment.

The containerized service is a containerized application microservice within a Kubernetes pod. The at least one security service may include a security threat intelligence service, a DNS resolution service, a DNS lookup service, a phishing protection service, a content filtering service, a cloud computing security service, a security rating service, and combinations thereof.

Additionally, the techniques described herein may be performed as a method and/or by a system having non-transitory computer-readable media storing computer-executable instructions that, when executed by one or more processors, performs the techniques described above.

Example Embodiments

This disclosure describes techniques for redirecting API calls from API endpoint hosts known to have vulnerabilities and that may prove to be a significant risk to a computer network to API endpoint hosts that have no known vulnerabilities may be considered safe with respect to an application service mesh. As described herein, an intelligent domain name system (DNS) engine (IDE) associated with a containerized service within a pod of a mesh network may be provided in order to snoop any DNS query from a containerized service. Further, the IDE may identify within the DNS query, an application program interface (API) endpoint name. Still further, the IDE may snoop a DNS response associated with the DNS query and identify an Internet protocol (IP) address associated with the API endpoint name. The IDE may further transmit the API endpoint name and the IP address to a controller. A list of safe API endpoint hosts with no known security vulnerabilities may be received from the controller based on security data obtained from at least one security service. The DNI may cache the list of safe API endpoint hosts including safe IP addresses. Further, the IDE may intercept a subsequent DNS request from the containerized service and transmit to the containerized service IP addresses of safe API endpoint hosts within the list of safe API endpoint hosts.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 2:
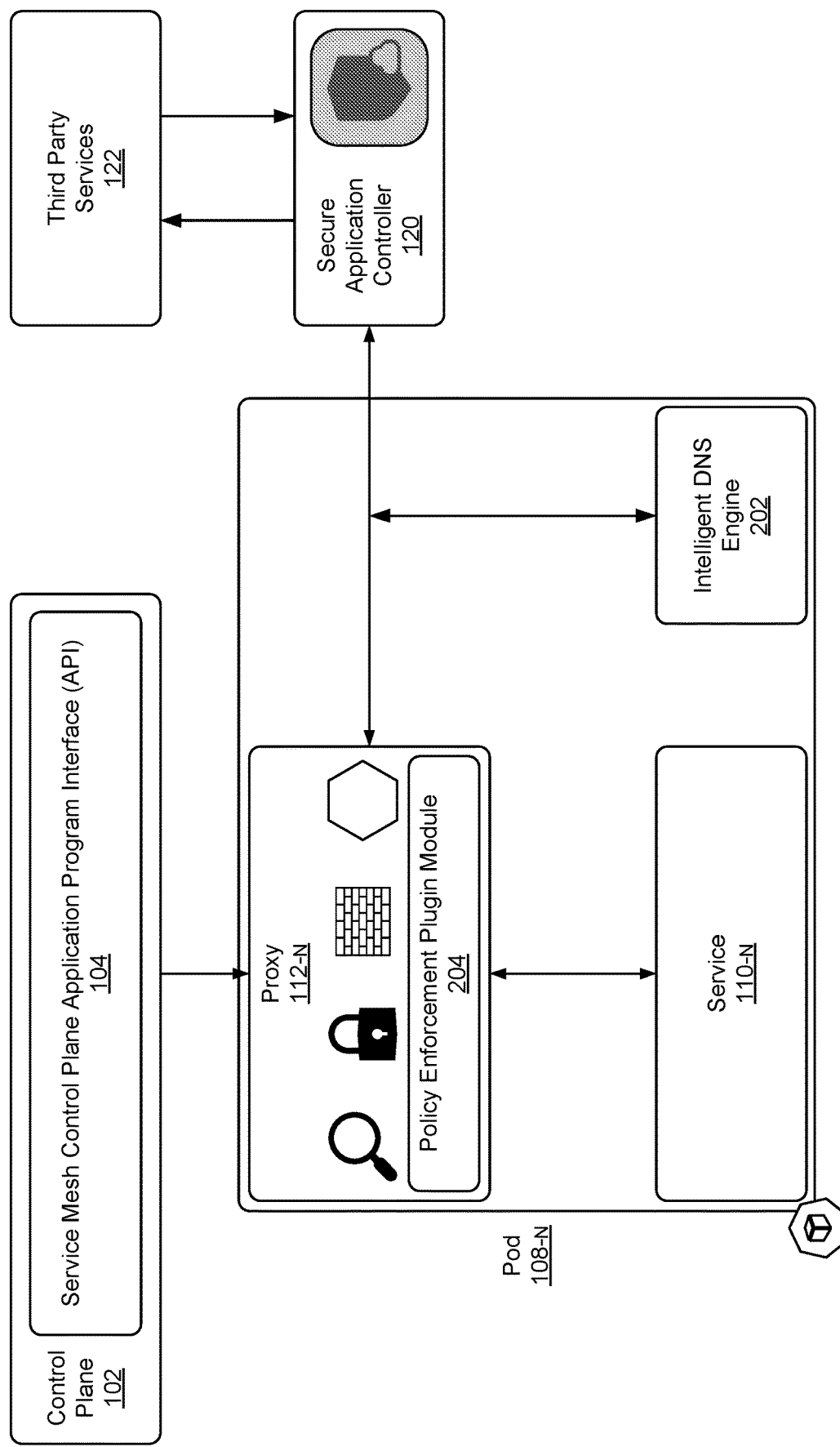
FIG. 2 illustrates a system-architecture diagram of a portion of the network of FIG. 1 that includes the IDE.

FIG. 1 illustrates a system-architecture diagram of a network 100 that utilizes an intelligent domain name system (DNS) engine (IDE) 202 for application program interface (API) endpoint host redirection, according to an example of the principles described herein. FIG. 2 illustrates a system-architecture diagram of a portion 200 of the network 100 of FIG. 1 that includes the IDE 202. The network 100 of FIGS. 1 and 2 may include a service mesh including a control plane 102 and a data plane 106. In the examples described herein, an application service mesh may include any dedicated infrastructure layer for facilitating service-to-service communications between services or microservices using a proxy.

The data plane 106 may include a set of intelligent proxies 112-1, 112-2, . . . , 112-N, where N is any integer greater than or equal to 1 (collectively referred to herein as proxy(ies) 112 unless specifically addressed otherwise). In one example, the proxies 112 may be referred to as sidecar proxies. Further, in one example, the proxies 112 may include, for example, an Envoy™ edge and service proxy.

The control plane 102 may provide a reliable framework based on, for example, the Istio™ service mesh framework. The control plane 102 may be defined as a part of the network 100 that is concerned with drawing the network topology and/or the information in a routing table that defines what to do with incoming data packets. Control plane functions, such as participating in routing protocols, may run in or by an architectural control element such as a service mesh control plane application program interface (API) 104. In one example, the routing table contains a list of destination addresses (e.g., addresses of the source computing device (not shown) and the requesting computing device (not shown)) and the outgoing interface(s) associated with each. The control plane 102 may include logic that may identify certain packets to be discarded, as well as preferential treatment of certain packets for which a high quality of service is defined by such mechanisms as differentiated services.

The data plane 106 may allow for mesh traffic 114 to flow between the proxies 112 of a number of pods 108-1, 108-2 . . . 108-N, where N is any integer greater than or equal to 1 (collectively referred to herein as pod(s) 108 unless specifically addressed otherwise). The mesh traffic 114 may include ingress traffic 116 and egress traffic 118. Each pod 108 may also include a number of services 110-1, 110-2 . . . 110-N, where N is any integer greater than or equal to 1 (collectively referred to herein as service(s) 110 unless specifically addressed otherwise). In one example, the services 110 may include any containerized application microservice existing within a Kubernetes container orchestration system. The systems and methods described herein apply to the mesh traffic 114 between proxies 112 within the data plane 106.

As depicted in FIG. 2, the proxy 112 (e.g., proxy 112-N) may include a number of additional functionalities within the proxy including any microservice application such as, for example, DNS detection services, packet inspection services, load balancing services, firewall services, performance monitoring services, container ingress services, logging services, monitoring services, tracing services, configuring services, and security services, among other types of services. Using a network 100 for microservices deployments enables efficient handling of service discovery, traffic management, security authentication, and authorization for container-based applications.

Further, the proxy 112 may include a policy enhancement plugin module 204. The policy enhancement plugin module 204 may be used as a plug-in to enforce policies defined by an administrator and/or autonomously by one or more elements of the network 100 described herein.

The pod 108 (e.g., pod 108-N) may further include an intelligent domain name system (DNS) engine (IDE) 202 associated with at least one containerized service within the pod 108. The IDE 202 may serve as a DNS detector to identify safe API endpoint hosts that the application(s) may use. The IDE 202 may work in concert with a secure application controller 120. In one example, the secure application controller 120 may include the Panoptica® cloud-native application security platform developed and distributed by Cisco® Systems, Inc.

A number of third party services 122 or other third party services may be used to support the secure application controller 120 as described herein. For example, the third party services 122 may include a security risk assessment service such as Bitsight® security risk assessment services developed and distributed by BitSight Technologies, Inc. Further, the third party services 122 may include malware detection and prevention services such as Talos® cybersecurity services developed and distributed by Cisco® Systems, Inc. Still further, the third party services 122 may include a cloud computing security product suite such as Umbrella® cloud computing security product suite developed and distributed by Cisco® Systems, Inc. that provides, for example, DNS resolution services, phishing protection services, content filtering services, etc. The third party services 122 may be utilized by the secure application controller 120 to identify security risks associated with a number of DNS resolution requests or API calls from the service 110, resolve the DNS resolution requests or API calls, and/or identify API endpoint hosts that are considered safe (e.g., API endpoint hosts which have no known vulnerabilities or an acceptable level of vulnerability) for the network 100. In one example, data from the third party services 122 may be stored in a database (not shown) accessible to the secure application controller 120 and/or the IDE 202, and this database may be updated on a periodic basis (e.g., daily updated) to ensure that the most up-to-date data from the third party services 122 is available. The third party services 122 may include, for example, security threat intelligence services, DNS resolution services, DNS lookup services, phishing protection services, content filtering services, cloud computing security services, security rating services, other types of services, and combinations thereof.

Figure 3:
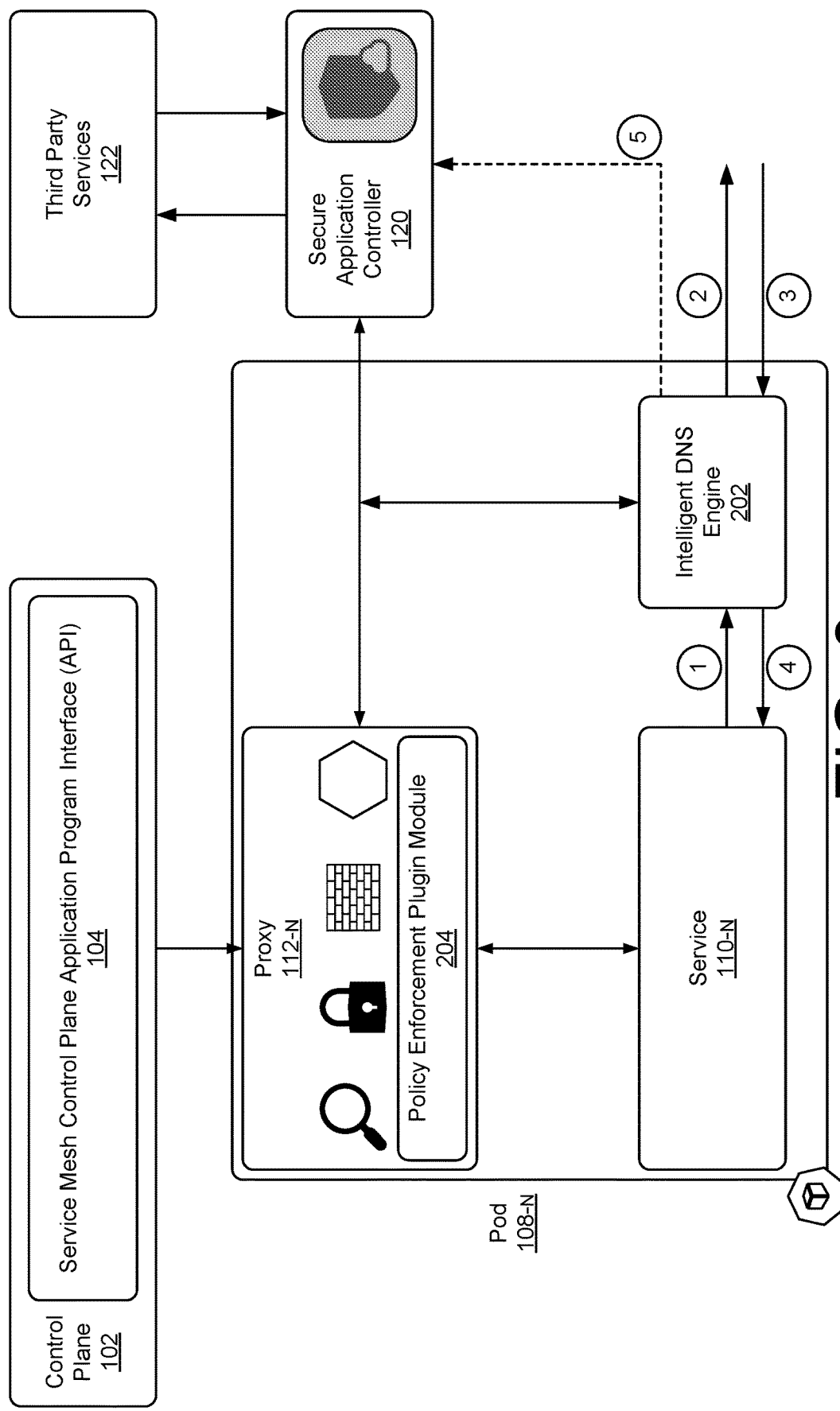
FIG. 3 illustrates a system-architecture diagram of a portion of the network of FIG. 1 that utilizes the IDE to snoop DNS queries, according to an example of the principles described herein.

FIGS. 3 through 6 illustrate the manner in which the network 100 performs API endpoint host redirection. FIG. 3 illustrates a system-architecture diagram of the portion 200 of the network 100 of FIG. 1 that utilizes the IDE 202 to snoop DNS queries, according to an example of the principles described herein. The numbered circles indicate processing throughout the network 100. For example, at 1, the service 110 (e.g., 110-N) may issue a DNS query and the IDE 202 may intercept the DNS query to snoop the DNS query to identify API endpoint calls within the DNS query as described herein. In other words, a first-time call to a new API may be made by the containerized service 110 (e.g., a containerized application microservice), and the IDE 202 may snoop the DNS query to resolve the API (e.g., external API red.horse-ho.com as provided as an example above).

At 2, the IDE 202 may send the DNS query to a DNS server (not shown) to resolve the DNS query. At 3, a DNS response may be received from the DNS server (not shown), and the IDE 202 may again snoop the DNS response to learn the IP address of the API endpoint host (e.g., 187.48.14.5 for the external API red.horse-ho.com).

Further, once the DNS response is received, the IDE 202 may also lower a time-to-live (TTL) of the external DNS response. In one example, a default DNS TTL may be 12 hours. In one example, the IDE 202 may reduce the TTL to a value such as, for example, 1 minute. In one example, the IDE 202 may lower the TTL value to a minimum value. Lowering or reducing the TTL value to a minimum value (e.g., 1 minute) allows the network 100 to ensure that an API endpoint host is secure. For example, the IDE 202 may determine if the API call is a first of such an API call wherein the security rating of such an API is unknown. In this situation, rather than allowing the API calls to be sent to an API endpoint host for an extended amount of time (e.g., a maximum TTL value such as a 12 hour TTL or a TTL value greater than the minimum TTL value) where no other API call is made until the maximum TTL value expires, the IDE 202 may set the TTL value to a minimum value (e.g., 1 minute) to provide the IDE 202 with enough time to obtain a response from the DNS server (not shown) and make a determination as to how secure the API endpoint host may be. The behavior of the application associated with the service does not change and may continue to make API calls to a given endpoint. The application may make such API calls using a given DNS name, and if the DNS name has expired, an explicit DNS call may be performed. This may result in the application performing a DNS call more frequently given the lowered TTL value (e.g., every minute for a TTL value of 1 minute), but the application may actually be unaware that the DNS call is being performed more often.

Further, once the DNS response is received, the IDE 202 may cache the DNS response. The DNS response may be cached so that as subsequent DNS queries are made, the subsequent DNS queries do not have to be forwarded to an external DNS server for resolution as indicated by 2 and 3 of FIG. 3, but may, instead be resolved locally within the pod 108 by the IDE 202. This local resolution of the subsequent DNS queries has the advantage of maintaining application performance while improving security within the network 100.

Figure 4:
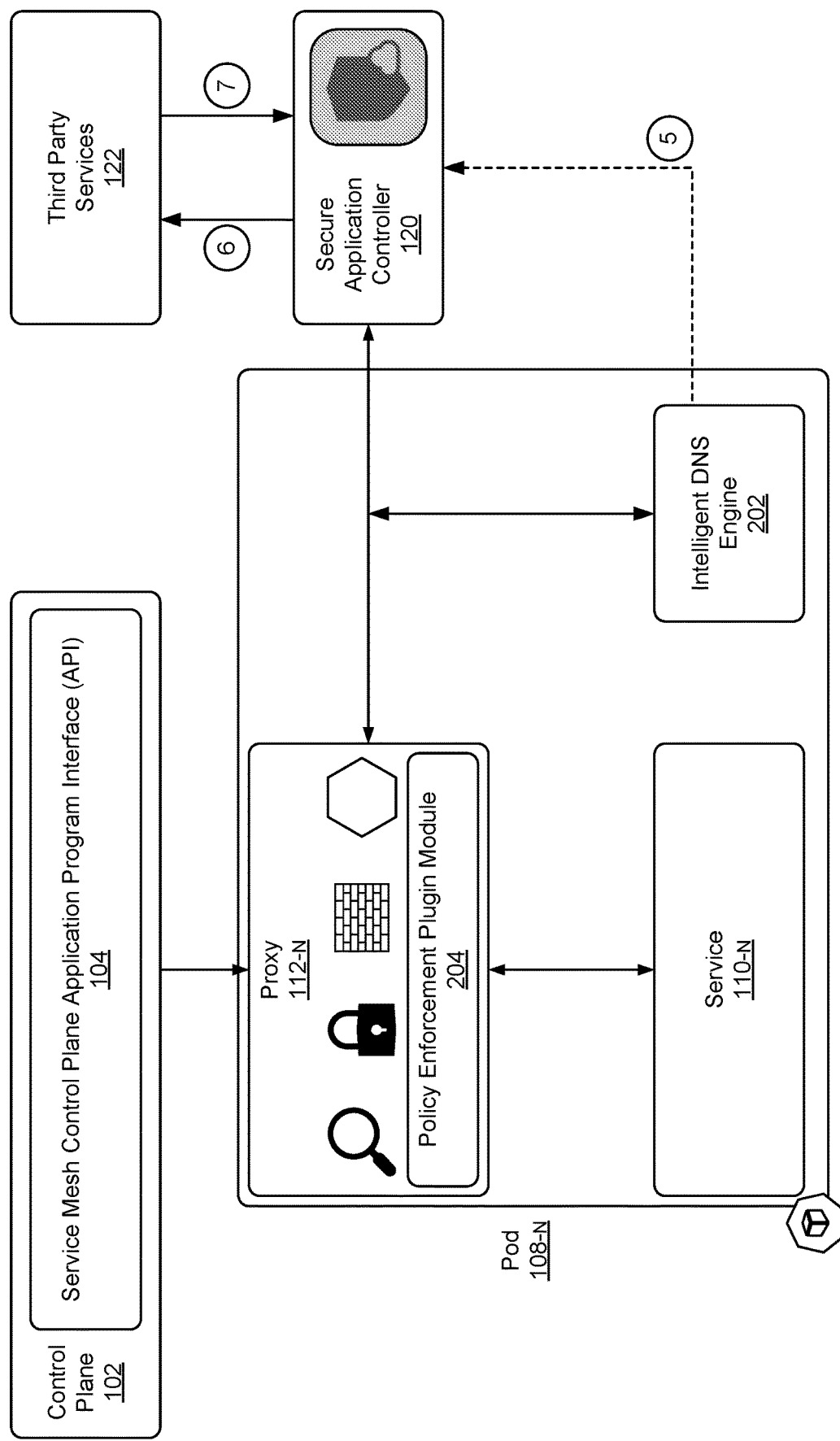
FIG. 4 illustrates a system-architecture diagram of a portion of the network of FIG. 1 that utilizes the IDE and security services to identify safe API endpoint hosts, according to an example of the principles described herein.

At 5, the IDE 202 may report the API endpoint name (e.g., red.horse-ho.com) and IP address (e.g., 187.48.14.5 for the external API red.horse-ho.com) of the API endpoint host to the secure application controller 120. Thus, FIG. 4 illustrates a system-architecture diagram of the portion 200 of the network 100 of FIG. 1 that utilizes the IDE 202 and security services including the secure application controller 120 and the third party services 122 to identify safe API endpoint hosts, according to an example of the principles described herein. The secure application controller 120 may assess the API endpoint name (e.g., red.horse-ho.com) and IP address (e.g., 187.48.14.5 for the external API red.horse-ho.com) and determine an overall risk of the continued use of the API endpoint host. At 6, the secure application controller 120 may access a number of third party services 122 such as a security risk assessment service such as Bitsight® security risk assessment services developed and distributed by BitSight Technologies, Inc.; malware detection and prevention services such as Talos® cybersecurity services developed and distributed by Cisco® Systems, Inc.; a cloud computing security product suite such as Umbrella® cloud computing security product suite developed and distributed by Cisco®

Systems, Inc. that provides, for example, DNS resolution services, phishing protection services, content filtering services, etc.

Figure 5:
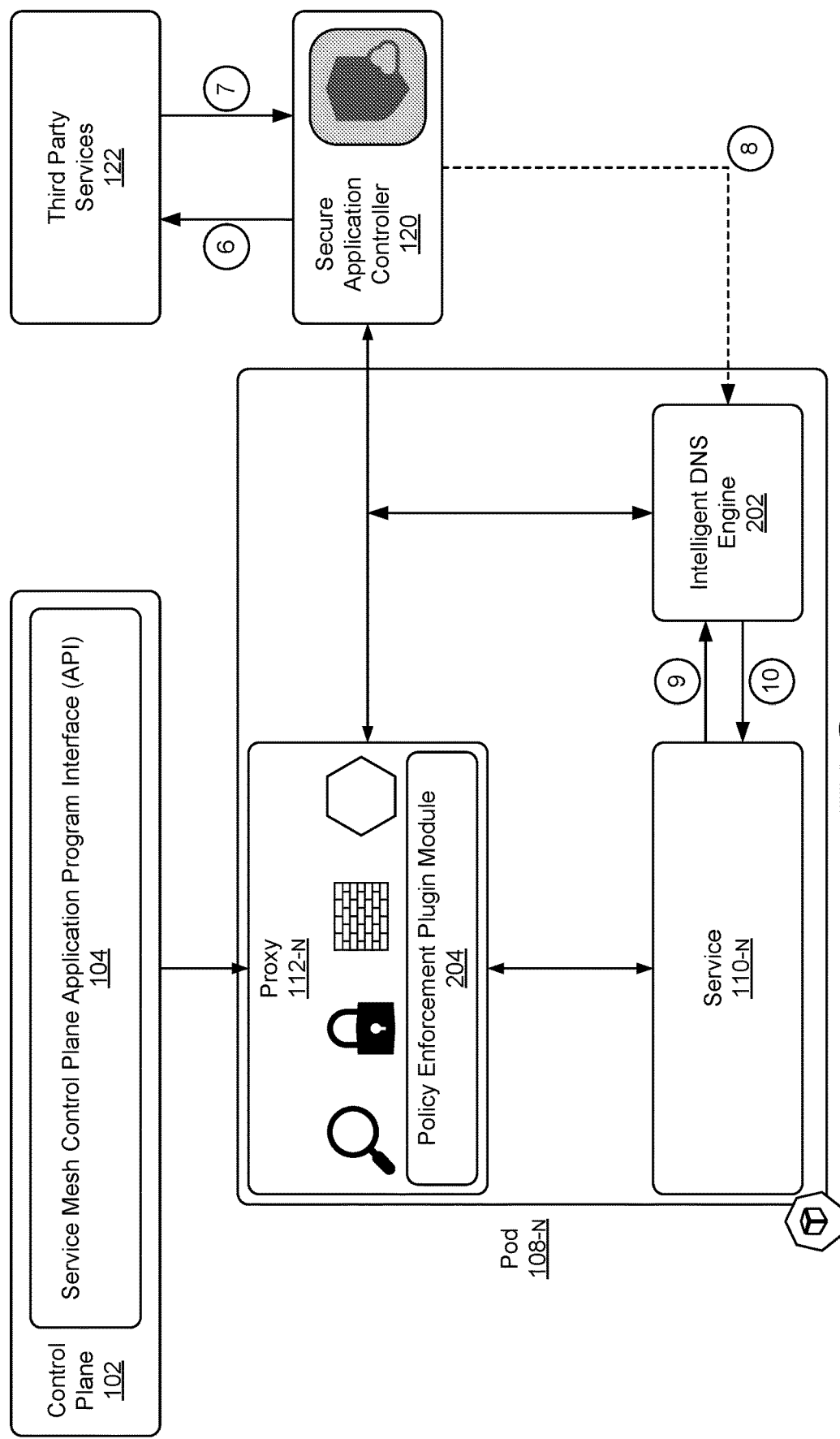
FIG. 5 illustrates a system-architecture diagram of a portion of the network of FIG. 1 that utilizes the IDE to intercept DNS requests, according to an example of the principles described herein.

At 7 of FIG. 4, the third party services 122 may provide information to the secure application controller 120 to identify a plurality of API endpoint hosts associated with the API endpoint name (e.g., red.horse-ho.com) and IP address (e.g., 187.48.14.5 for the external API red.horse-ho.com). FIG. 5 illustrates a system-architecture diagram of the portion 200 of the network 100 of FIG. 1 that utilizes the IDE 202 to intercept DNS requests, according to an example of the principles described herein. At 8 of FIG. 5, the secure application controller 120 may instruct the IDE 202 to cache a list of API endpoint hosts in use with no known vulnerabilities (e.g., "safe" API endpoint hosts). In continuation of the example described above, the safe API endpoints may include API endpoint hosts 95.87.102.223 and 158.100.228.147 associated with the API endpoint name red.horse-ho.com and IP address. In the examples described herein, the secure application controller 120 may instruct each IDE 202 included within each containerized proxies 112 (e.g., each containerized microservice sidecar proxies) of the pods 108 to cache a list of API endpoint hosts in use that have no known vulnerabilities.

In one example, in order to increase efficiency, the IDE 202 of each pod 108 and/or the secure application controller 120 may track and associate individual services 110 (e.g., individual containerized application microservices) with the respective API call(s) the services 110 make. Tracking and associating the services 110 with the respective API call(s) the services 110 make may reduce irrelevant DNS caching within the IDEs 202 for each pod 108. For example, if a "checkout" application microservice calls the red.horse-ho.com API, only the IDEs 202 in pods 108 hosting the "checkout" application microservice may be programmed to cache these specific safe API endpoint hosts (e.g., 95.87.102.223 and 158.100.228.147).

Once the safe API endpoint hosts are identified, the TTL value for the safe API endpoint hosts may be increased. In one example, the increased TTL value may be assigned a value by the secure application controller 120 that is greater than the minimum TTL value described above, less than the maximum value, less than the default value (e.g., 12 hours), and combinations thereof. In one example, the increased TTL value for the safe API endpoint hosts may be set to 1 hour.

As described herein, the IDE 202 may cache and resolve subsequent DNS requests locally within the pod to improve application performance. Thus, at 9 of FIG. 5, the service 110 may make a subsequent DNS query and the IDE 202 may intercept the subsequent DNS query for the APIs and replying to the service at 10 of FIG. 5 with IP addresses of safe API endpoint hosts. This may increase efficiency of the pods 108 within the network 100

In the event that the risk assessment of an API endpoint host changes, the secure application controller 120 may instruct the IDE 202 to reduce the TTL value of the IP address(es) of the respective API endpoint host(s) to, for example, the minimum TTL value. Thus, at 11, the third party services 122 may provide an update to the risk assessment of one or more API endpoint hosts to the secure application controller 120. For example, the Talos® cybersecurity services developed and distributed by Cisco® Systems, Inc. may detect and report to the secure application controller 120 a new vulnerability for an API endpoint host. At 12, the secure application controller 120 may send the instructions to the IDE 202 to reduce the TTL value of the IP address(es) of the respective API endpoint host(s). In one example, the secure application controller 120 may instruct the IDE 202 to reduce the TTL value to the minimum TTL value, a TTL value less than a maximum TTL value, an intermediate TTL value, or some other reduced TTL value in order to ensure that the risk of accessing the API endpoint host(s) that are reevaluated as being vulnerable is reduced. Reduction of the TTL value allows for devices within the network 100 that are able to resolve the DNS queries to not be able to cache information regarding the vulnerable API endpoint host(s) for an extended period of time (e.g., for more than 1 minute).

Figure 6:
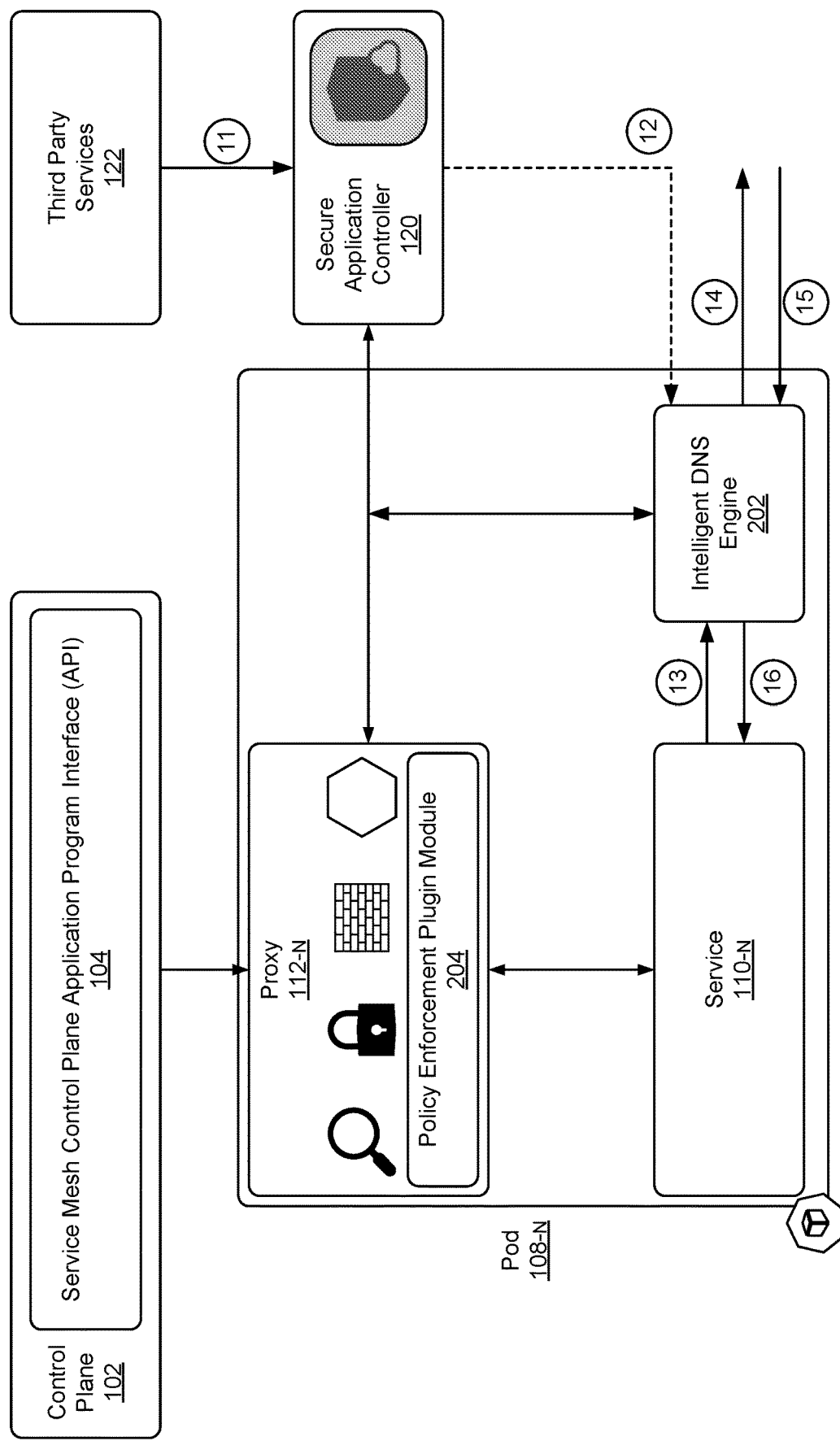
FIG. 6 illustrates a system-architecture diagram of a portion of the network of FIG. 1 that utilizes the IDE and security services to address new vulnerabilities, according to an example of the principles described herein.

The network 100 may further dynamically adapt to a change in the risk assessment. A period of time may elapse before the API calls may be redirected to other safe API endpoint hosts by the IDE 202 via the TTL adjustments described herein. For example, an hour may elapse before the redirection described herein occurs. FIG. 6 illustrates a system-architecture diagram of a portion 200 of the network 100 of FIG. 1 that utilizes the IDE 202, the secure application controller 120, and the third party services 122 to address new vulnerabilities, according to an example of the principles described herein. If the security posture of an entity utilizing the present systems and methods requires a more immediate response to vulnerabilities and threats, then the IDE 202 may, for any new flow to the API endpoint host, hot swap the destination IP address in the IP packet header(s) of the DNS queries received at 13 of FIG. 6 with IP address(es) of safe API endpoint host(s). At 14 of FIG. 6, the IDE 202 may forward the data packet to a DNS server (not shown) to resolve the DNS query. Similarly, at 15 of FIG. 6, a DNS response may be received from the DNS server (not shown), and the IDE 202 may hot swap the source IP address in the returning IP packet header(s) with the same IP address(es) of safe API endpoint host(s) and forward the data packet back to the service 110 at 16 of FIG. 6. As a result of the hot swapping, transparent redirection to the safe API endpoint host(s) may occur significantly sooner. Further, in this manner, the IDE effectively serves as an API network address translation (NAT) device. Thus, when a service 110 makes a DNS query for an unsecure or vulnerable API, the IDE 202, and the secure application controller 120 will cause the service 110 to resolve to an IP address the IDE 202 and the secure application controller 120 provide the service 110 and redirects the service 110 away from the unsecure or vulnerable API.

In the examples described herein, the secure application controller 120 may interact with a plurality of IDEs 202 included within a corresponding number of pods 108 in order to bring about the systems and methods described herein. In this manner, any number of different services 110 may be implemented in the network 100, and specific API endpoint hosts which have no known vulnerabilities or an acceptable level of vulnerability. Thus, even though the portion 200 of the network 100 of FIG. 1 is depicted in FIGS. 2 through 6, any number of pods 108 may benefit from the IDE 202, the secure application controller 120, and the third party services 122 and their respective functions as described herein.

Figure 7:
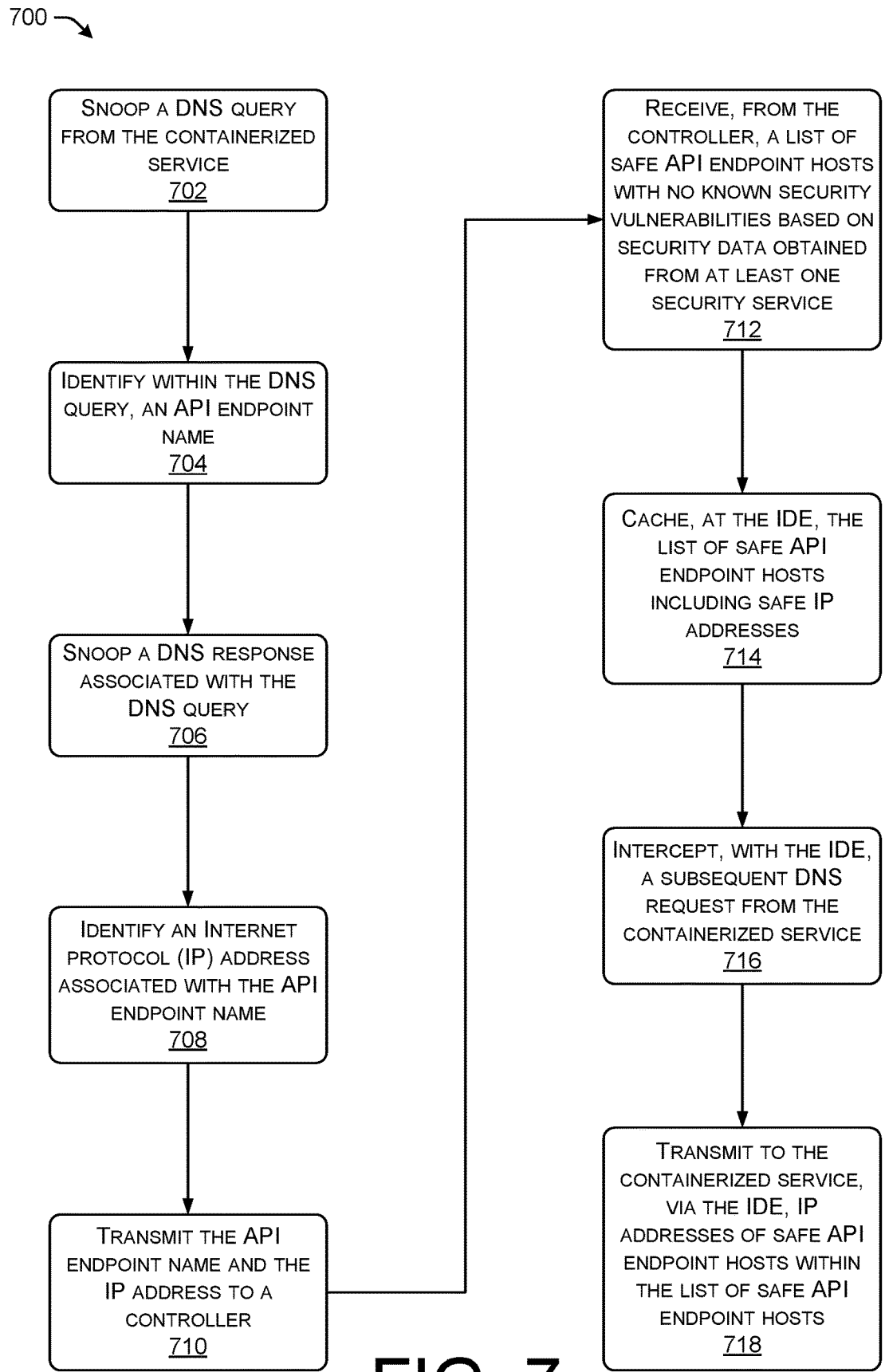
FIG. 7 illustrates a flow diagram of an example method for API endpoint host redirection, according to an example of the principles described herein.
Figure 8:
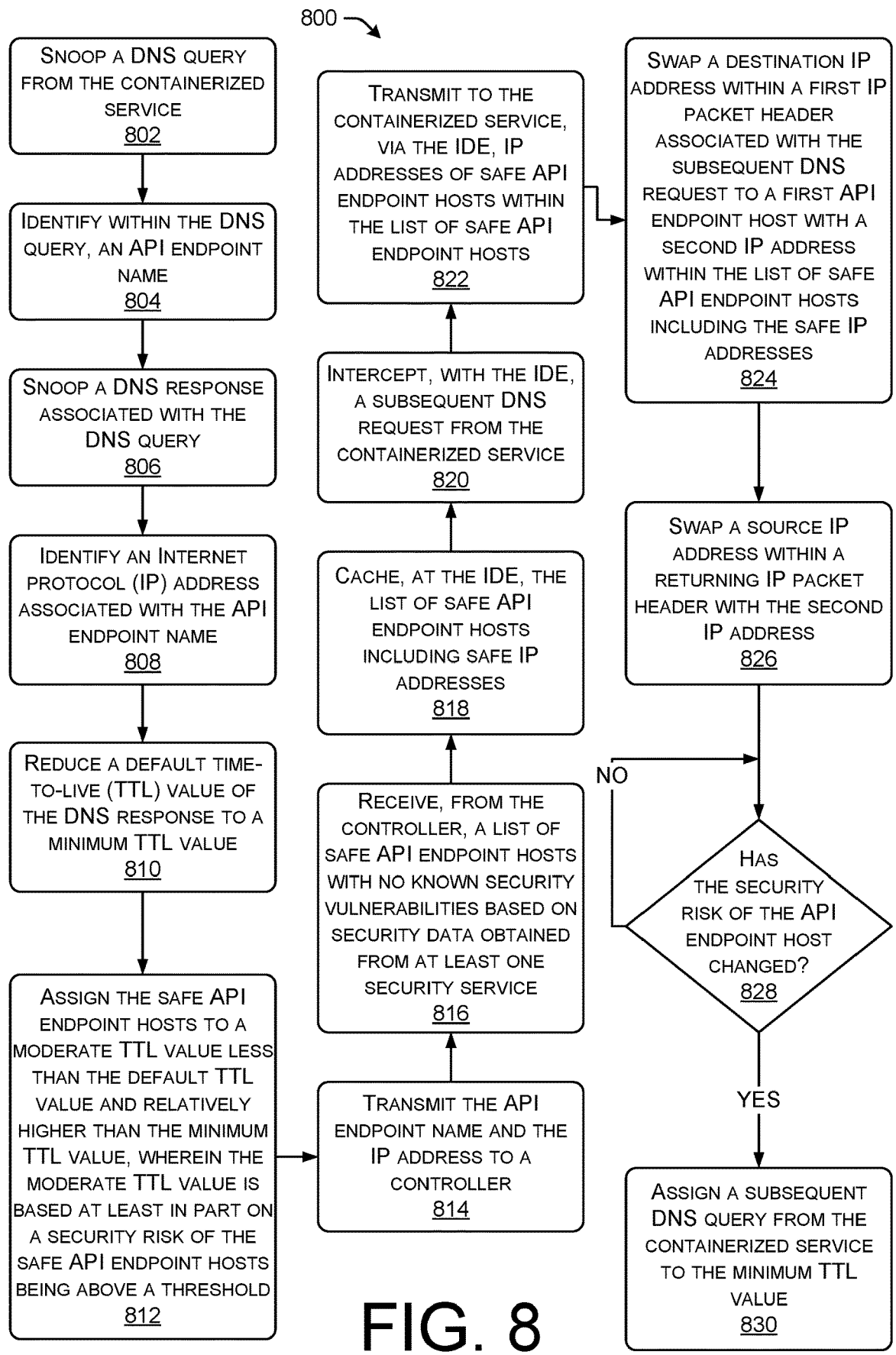
FIG. 8 illustrates a flow diagram of an example method for API endpoint host redirection, according to an example of the principles described herein.

FIGS. 7 and 8 illustrate flow diagrams of example methods 700 and 800 and that illustrate aspects of the functions performed at least partly by the service mesh control plane API 104 of the control plane 102, the pods 108 of the data plane, the proxies 112, the services 110, the IDE 202, the secure application controller 120, the third party services 122, other devices as described in FIGS. 1 through 6, and combinations thereof. The logical operations described herein with respect to FIGS. 7 and 8 may be implemented (1) as a sequence of computer-implemented acts or program modules running on a computing system and/or (2) as interconnected machine logic circuits or circuit modules within the computing system. In some examples, the method(s) 700 and 800 may be performed by a system comprising one or more processors and one or more non-transitory computer-readable media storing computer-executable instructions that, when executed by the one or more processors, cause the one or more processors to perform the method(s) 700 and 800.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 7 and 8 described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 7 illustrates a flow diagram of an example method 700 for API endpoint host redirection, according to an example of the principles described herein. The method 700 may be performed using the IDE 202, the secure application controller 120, and the third party services 122 in concert with the pods 108 and their respective proxies 112 and services 110. Thus, at 702, with the IDE 202 associated with the service 110 service 110 (e.g., a containerized application microservice) within a pod 108 of the network 100 (e.g., a mesh network), snooping a DNS query from the containerized service to resolve the API (e.g., external API red.horse-ho.com as provided as an example above). The service 110 (e.g., 110-N) may issue a DNS query and the IDE 202 may intercept the DNS query to snoop the DNS query to identify API endpoint calls within the DNS query as described herein. In other words, a first-time call to a new API may be made by the service 110 (e.g., a containerized application microservice).

At 704, the IDE 202 may identify within the DNS query, an API endpoint name (e.g., the external API red.horse-ho.com). The IDE 202 may, at 706, snoop a DNS response received from a DNS server (not shown) and associated with the DNS query. At 708, the IDE 202 may identify an IP address associated with the API endpoint name and transmit the API endpoint name and the IP address to the secure application controller 120 at 710.

At 712, the method 700 may further include receiving, from the secure application controller 120, a list of safe API endpoint hosts with no known security vulnerabilities. As described herein, the list of safe API endpoint hosts with no known security vulnerabilities may be provided to the secure application controller 120 based on security data obtained from at least one security service provided by the third party services 122.

The IDE 202 may cache the list of safe API endpoint hosts including safe IP addresses at 714. At 716, the IDE 202 may intercept a subsequent DNS request from the service 110, and, at 718, transmit to the service 110, IP addresses of safe API endpoint hosts within the list of safe API endpoint hosts.

FIG. 8 illustrates a flow diagram of an example method 800 for API endpoint host redirection, according to an example of the principles described herein. FIG. 8 illustrates a flow diagram of an example method 800 for API endpoint host redirection, according to an example of the principles described herein. The method 800 may be performed using the IDE 202, the secure application controller 120, and the third party services 122 in concert with the pods 108 and their respective proxies 112 and services 110. Thus, at 802, the IDE 202 associated with the service 110 (e.g., a containerized application microservice) within a pod 108 of the network 100 (e.g., a mesh network), may snoop a DNS query from the containerized service to resolve the API (e.g., external API red.horse-ho.com as provided as an example above). The service 110 (e.g., 110-N) may issue a DNS query and the IDE 202 may intercept the DNS query to snoop the DNS query to identify API endpoint calls within the DNS query as described herein. In other words, a first-time call to a new API may be made by the service 110 (e.g., a containerized application microservice).

At 804, the IDE 202 may identify within the DNS query, an API endpoint name (e.g., the external API red.horse-ho.com). The IDE 202 may, at 806, snoop a DNS response received from a DNS server (not shown) and associated with the DNS query. At 808, the IDE 202 may identify an IP address associated with the API endpoint name.

At 810, the IDE 202 and/or the secure application controller 120 may reduce a default TTL value of the DNS response to a minimum TTL value. The IDE 202 and/or the secure application controller 120 may assign the safe API endpoint hosts to a moderate TTL value less than the default TTL value and relatively higher than the minimum TTL value at 812. In one example, the moderate TTL value may be based at least in part on a security risk of the safe API endpoint hosts being above a threshold.

At 814, the IDE may transmit the API endpoint name and the IP address to the secure application controller 120. At 816, the method 800 may further include receiving, from the secure application controller 120, a list of safe API endpoint hosts with no known security vulnerabilities. As described herein, the list of safe API endpoint hosts with no known security vulnerabilities may be provided to the secure application controller 120 based on security data obtained from at least one security service provided by the third party services 122.

The IDE 202 may cache the list of safe API endpoint hosts including safe IP addresses at 818. At 820, the IDE 202 may intercept a subsequent DNS request from the service 110, and, at 822, transmit to the service 110, IP addresses of safe API endpoint hosts within the list of safe API endpoint hosts.

The method 800 may further include, at 824, swapping a destination IP address within a first IP packet header associated with the subsequent DNS request to a first API endpoint host with a second IP address within the list of safe API endpoint hosts including the safe IP addresses. This allows for only the safe API endpoint hosts to be accessed. At 826, a source IP address within a returning IP packet header may be swapped with the second IP address at 826.

At 828 of the method 800, the IDE 202 and/or the secure application controller 120 may determine if the security risk of the API endpoint host has changed based on information and updates received from the third party services 122. For example, the third party services 122 may regularly update the IDE 202 and/or the secure application controller 120 of any changes to API endpoint hosts that have been previously addressed by the third party services 122. The process of determining if the security risk of the API endpoint host has changed may include receiving, from the secure application controller 120, an updated risk assessment from the at least one security service (e.g., the third party services 122), and updating, at the IDE 202, at least one entry of the list of safe API endpoint hosts to reflect the updated risk assessment.

At 828, in response to a determination that the security risk of the API endpoint host has not changed (828, determination NO), then the method 800 may loop back to 828 for continuous or periodic determination if the security risk of the API endpoint host has changed. In response, however, to a determination that the security risk of the API endpoint host has changed (828, determination YES), then the IDE 202 and/or the secure application controller 120 may assign the subsequent DNS query from the containerized service to that includes the API endpoint host in question to the minimum TTL value at 830. Thus, even in instances where the risk posture of the API endpoint host may have changed, the method 800 allows for the network 100 to continually reassess any security threats to the network 100.

Thus, in applying the systems and methods described herein, the network 100 may leverage the deep packet inspection capabilities provided by a service mesh to identify APIs in use within an organization. Furthermore, the present systems and methods may utilize third party resources (e.g., the third party services 122) to provide security insights and risk ratings of these APIs and specific API endpoint hosts. Thus, the present systems and methods provide for transparent or "frictionless" API redirection by not requiring an application to change its behavior nor any of the underlying mechanisms. The present systems and methods utilize existing mechanisms in a new way to achieve the present functionality rather than changing the application logic or code. Thus, from the perspective of the application, the application is not aware that there has been a change.

The present systems and methods reduce exposure to API threats while the API is being evaluated or assessed for risk and include DNS snooping. TTL modification, caching and interception of DNS queries and responses. Further, the present systems and methods redirect API calls dynamically and transparently to "safe" API endpoint hosts while maintaining application availability and functionality at least partially through caching the safe API endpoints, modifying TTL values, and intercepting new DNS requests. Still further, the present systems and methods react to changes in API risk assessments through TTL reduction, caching, and interception. Even still further, the present systems and methods further optimize reaction time for dynamic and transparent redirection of the API endpoint hosts using an API NAT-like process.

Figure 9:
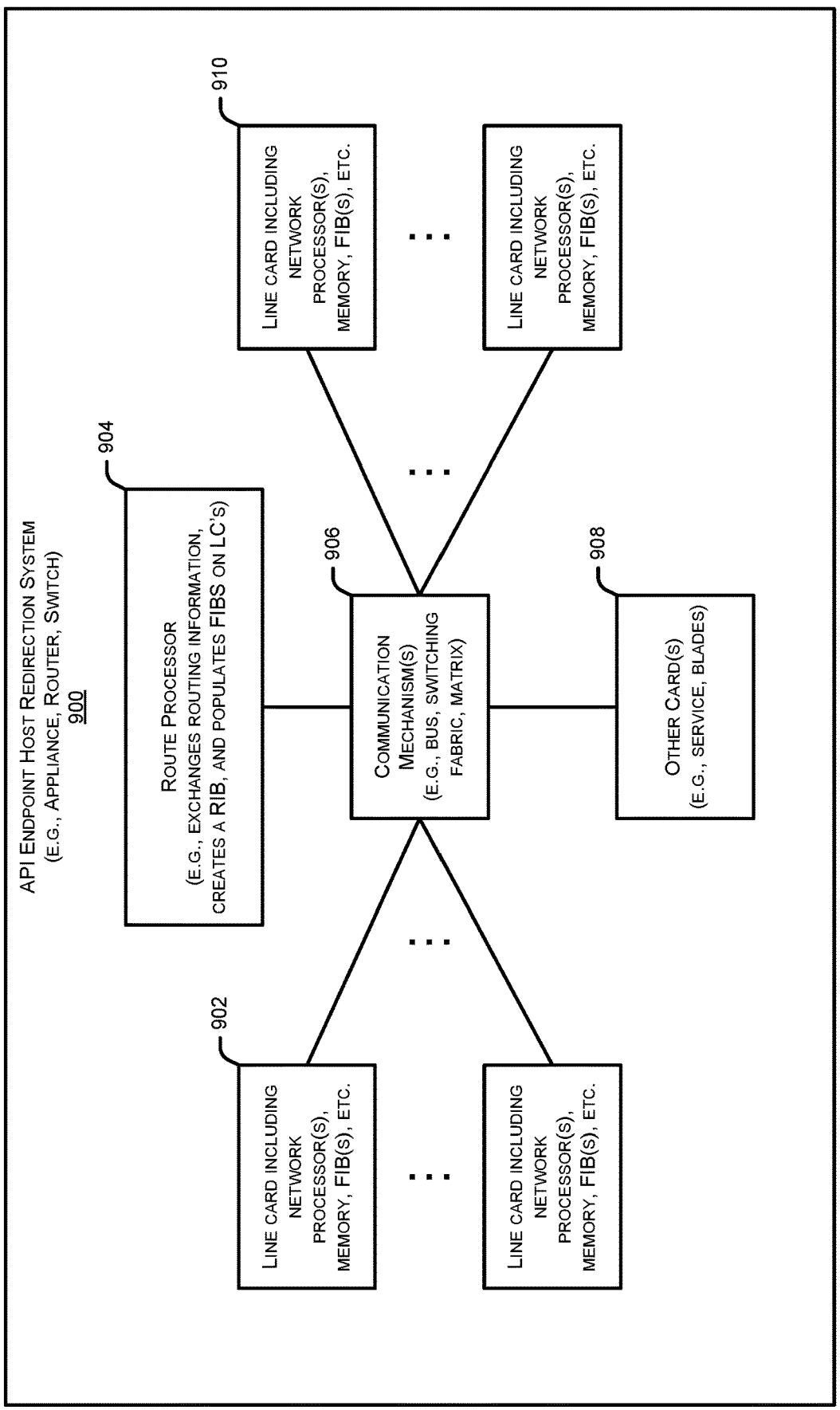
FIG. 9 illustrates a block diagram illustrating an example API endpoint host redirection system that can be utilized to implement various aspects of the technologies disclosed herein.

FIG. 9 illustrates a block diagram illustrating an example API endpoint host redirection device or system 900 that may be utilized to implement various aspects of the technologies disclosed herein. In some examples, API endpoint host redirection system 900 may be employed in various networks, such as, for example, network 100 as described with respect to FIG. 1.

In some examples, an API endpoint host redirection system 900 may comprise multiple line card(s) 902, 910, each with one or more network interfaces for sending and receiving packets over communications links (e.g., possibly part of a link aggregation group). The API endpoint host redirection system 900 may also have a control plane with one or more processing elements 904 for managing the control plane and/or control plane processing of packets associated with forwarding of packets in a network. The API endpoint host redirection system 900 may also include other cards 908 (e.g., service cards, blades) which include processing elements that are used to process (e.g., forward/send, drop, manipulate, change, modify, receive, create, duplicate, apply a service) packets associated with forwarding of packets in a network. The API endpoint host redirection system 900 may comprise hardware-based communication mechanism 906 (e.g., bus, switching fabric, and/or matrix, etc.) for allowing its different entities 902, 904, 908 and 910 to communicate. Line card(s) 902, 910 may typically perform the actions of being both an ingress and/or an egress line card 902, 910, in regard to multiple other particular packets and/or packet streams being received by, or sent from, API endpoint host redirection system 900.

Figure 10:
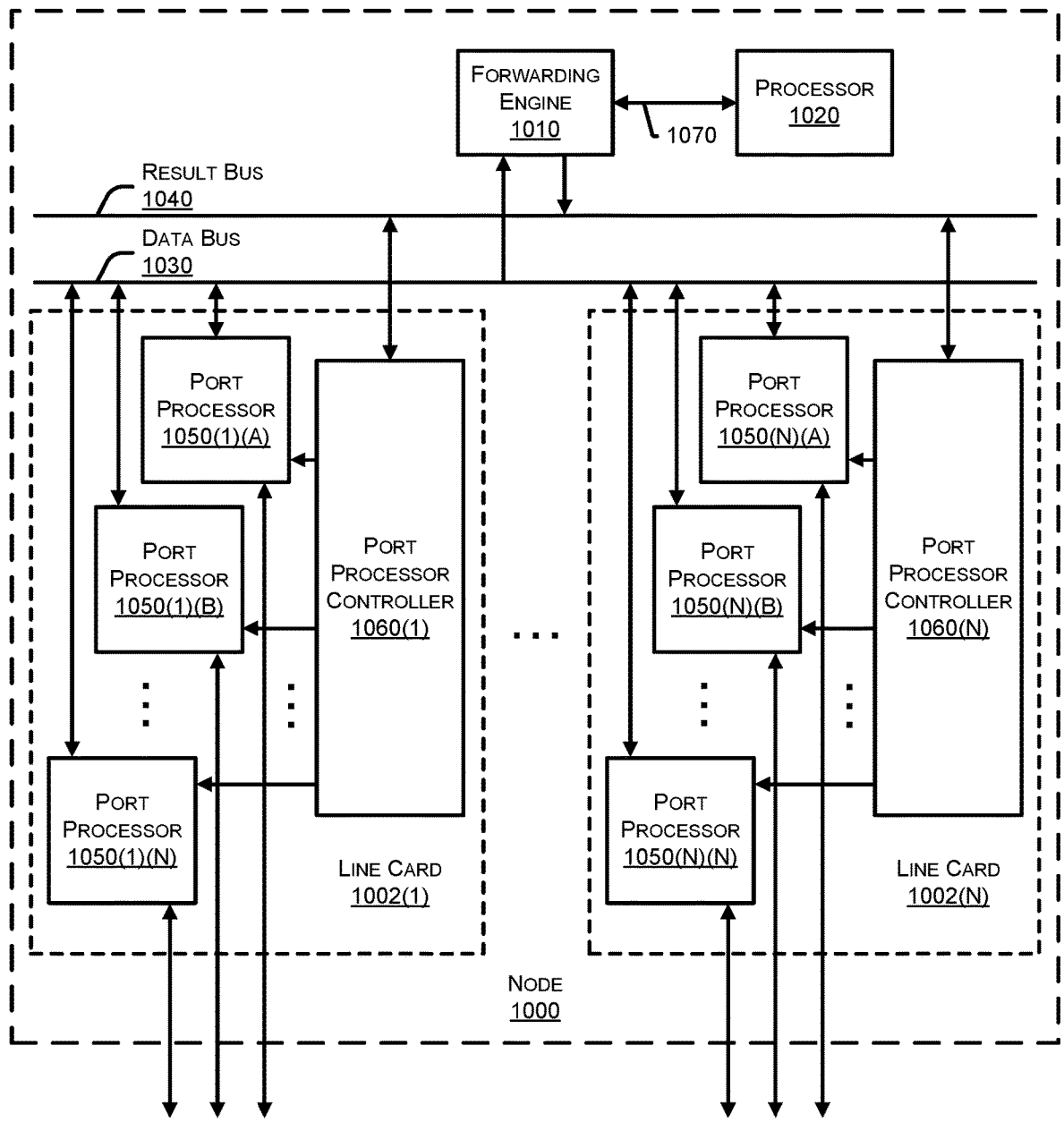
FIG. 10 illustrates a block diagram illustrating certain components of an example node that can be utilized to implement various aspects of the technologies disclosed herein.

FIG. 10 illustrates a block diagram illustrating certain components of an example node 1000 that may be utilized to implement various aspects of the technologies disclosed herein. In some examples, node(s) 1000 may be employed in various networks, such as, for example, network 100 as described with respect to FIG. 1.

In some examples, node 1000 may include any number of line cards 1002 (e.g., line cards 1002(1)-(N), where N may be any integer greater than 1) that are communicatively coupled to a forwarding engine 1010 (also referred to as a packet forwarder) and/or a processor 1020 via a data bus 1030 and/or a result bus 1040. Line cards 1002(1)-(N) may include any number of port processors 1050(1)(A)-(N)(N) which are controlled by port processor controllers 1060(1)-(N), where N may be any integer greater than 1. Additionally, or alternatively, forwarding engine 1010 and/or processor 1020 are not only coupled to one another via the data bus 1030 and the result bus 1040, but may also communicatively coupled to one another by a communications link 1070.

The processors (e.g., the port processor(s) 1050 and/or the port processor controller(s) 1060) of each line card 1002 may be mounted on a single printed circuit board. When a packet or packet and header are received, the packet or packet and header may be identified and analyzed by node 1000 (also referred to herein as a router) in the following manner. Upon receipt, a packet (or some or all of its control information) or packet and header may be sent from one of port processor(s) 1050(1)(A)-(N)(N) at which the packet or packet and header was received and to one or more of those devices coupled to the data bus 830 (e.g., others of the port processor(s) 1050(1)(A)-(N)(N), the forwarding engine 1010 and/or the processor 1020). Handling of the packet or packet and header may be determined, for example, by the forwarding engine 1010. For example, the forwarding engine 1010 may determine that the packet or packet and header should be forwarded to one or more of port processors 1050(1)(A)-(N)(N). This may be accomplished by indicating to corresponding one(s) of port processor controllers 1060(1)-(N) that the copy of the packet or packet and header held in the given one(s) of port processor(s) 1050(1)(A)-(N)(N) should be forwarded to the appropriate one of port processor(s) 1050(1)(A)-(N)(N). Additionally, or alternatively, once a packet or packet and header has been identified for processing, the forwarding engine 1010, the processor 1020, and/or the like may be used to process the packet or packet and header in some manner and/or may add packet security information in order to secure the packet. On a node 1000 sourcing such a packet or packet and header, this processing may include, for example, encryption of some or all of the packet's or packet and header's information, the addition of a digital signature, and/or some other information and/or processing capable of securing the packet or packet and header. On a node 1000 receiving such a processed packet or packet and header, the corresponding process may be performed to recover or validate the packet's or packet and header's information that has been secured.

Figure 11:
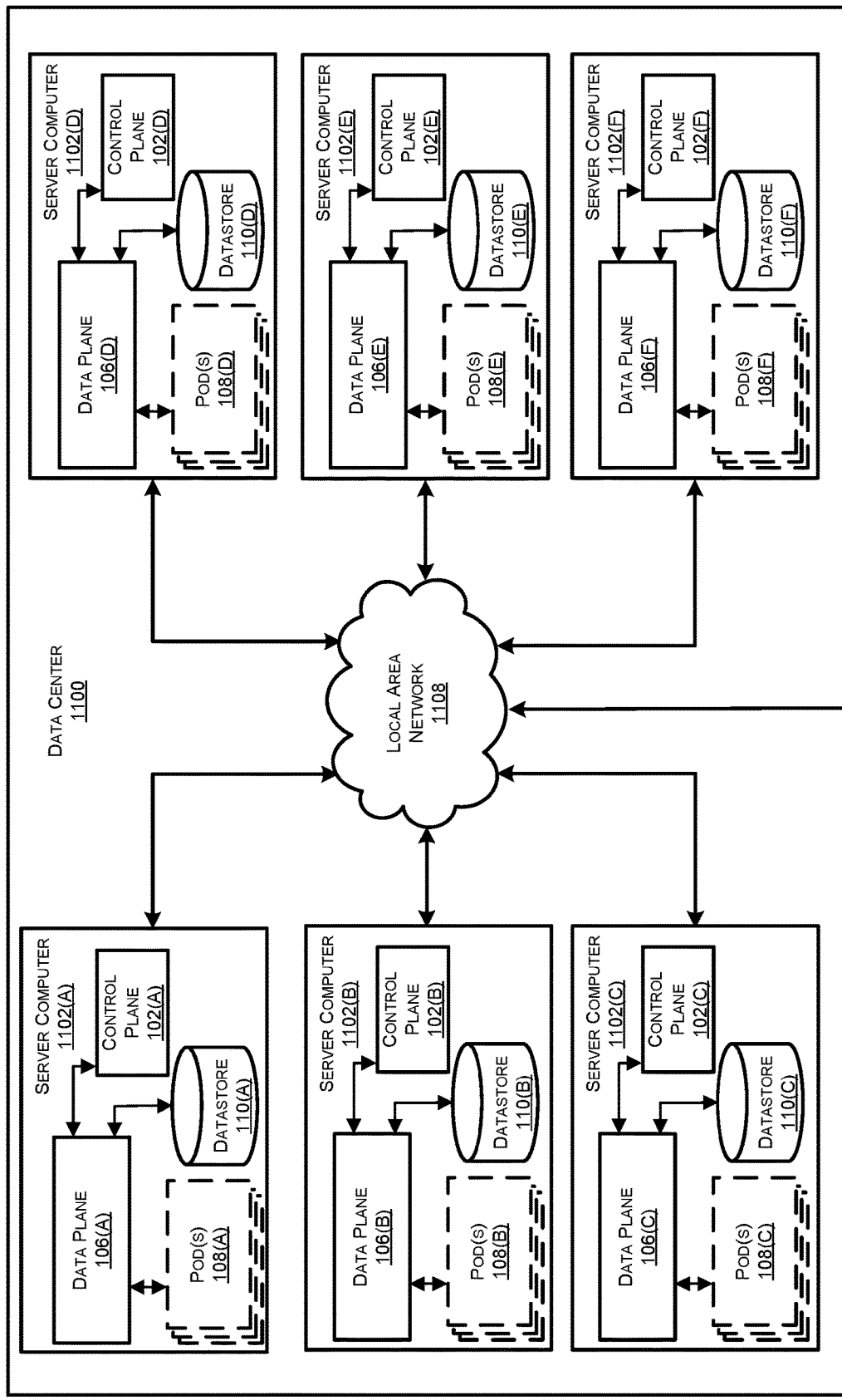
FIG. 11 illustrates a computing system diagram illustrating a configuration for a data center that can be utilized to implement aspects of the technologies disclosed herein.

FIG. 11 illustrates a computing system diagram illustrating a configuration for a data center 1100 that may be utilized to implement aspects of the technologies disclosed herein. The example data center 1100 shown in FIG. 11 includes several server computers 1102A-1102E (which might be referred to herein singularly as "a server computer 1102" or in the plural as "the server computers 1102") for providing computing resources. In some examples, the server computers 1102 may include, or correspond to, the servers associated with the network 100, the API endpoint host redirection system 900, and/or the node 1000 described herein with respect to FIGS. 1, 9 and 10, respectively.

The server computers 1102 may be standard tower, rackmount, or blade server computers configured appropriately for providing the computing resources described herein. As mentioned above, the computing resources provided by the network 100 may be data processing resources such as VM instances or hardware computing systems, database clusters, computing clusters, storage clusters, data storage resources, database resources, networking resources, and others. Some of the server computers 1102 may also be configured to execute a resource manager capable of instantiating and/or managing the computing resources. In the case of VM instances, for example, the resource manager may be a hypervisor or another type of program configured to enable the execution of multiple VM instances on a single server computer 1102. Server computers 1102 in the data center 1100 may also be configured to provide network services and other types of services.

In the example data center 1100 shown in FIG. 11, an appropriate LAN 1108 is also utilized to interconnect the server computers 1102A-1102E. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 1100, between each of the server computers 1102A-1102E in each data center 1100, and, potentially, between computing resources in each of the server computers 1102. It should be appreciated that the configuration of the data center 1100 described with reference to FIG. 11 is merely illustrative and that other implementations may be utilized.

In some examples, the server computers 1102 may each execute a data plane 106 including one or more pod(s) 108 including prox(ies) 112 and service(s) 112 and/or the control plane 102 including the service mesh control plane API 104, the secure application controller 120, and/or the third party services 122.

In some instances, the network 100 may provide computing resources, like application containers, VM instances, and storage, on a permanent or an as-needed basis. Among other types of functionality, the computing resources provided by the network 100 may be utilized to implement the various services described above. The computing resources provided by the network 100 may include various types of computing resources, such as data processing resources like application containers and VM instances, data storage resources, networking resources, data communication resources, network services, and the like.

Each type of computing resource provided by the network 100 may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The server computers 1102 may also be configured to provide other types of computing resources not mentioned specifically herein.

The computing resources provided by the network 100 may be enabled in one embodiment by one or more data centers 1100 (which might be referred to herein singularly as "a data center 1100" or in the plural as "the data centers 1100"). The data centers 1100 are facilities utilized to house and operate computer systems and associated components. The data centers 1100 typically include redundant and backup power, communications, cooling, and security systems. The data centers 1100 may also be located in geographically disparate locations. One illustrative embodiment for a data center 1100 that may be utilized to implement the technologies disclosed herein will be described below with regard to FIG. 12.

Figure 12:
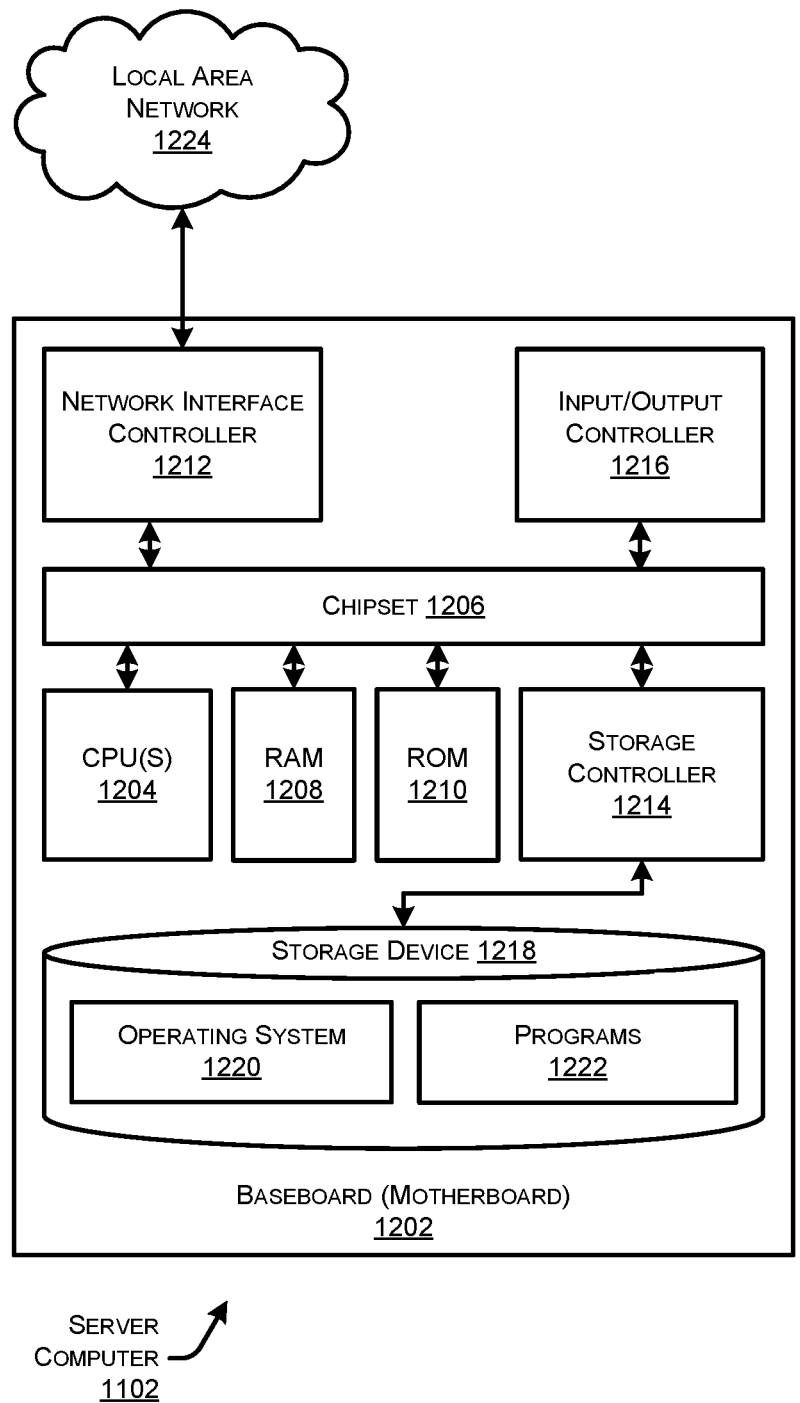
FIG. 12 is a computer architecture diagram showing an illustrative computer hardware architecture for implementing a server device that can be utilized to implement aspects of the various technologies presented herein.

FIG. 12 shows an example computer architecture for a server computer (or network routing device) 1102 capable of executing program components for implementing the functionality described above. The computer architecture shown in FIG. 12 illustrates a conventional server computer, workstation, desktop computer, laptop, tablet, network appliance, e-reader, smartphone, or other computing device, and may be utilized to execute any of the software components presented herein. The server computer 1102 may, in some examples, correspond to a physical server of a data center, the network 100, the API endpoint host redirection system 900, and/or the node 1000 described herein with respect to FIGS. 1, 9, and 10, respectively.

The server computer 1102 includes a baseboard 1202, or "motherboard," which is a printed circuit board to which a multitude of components or devices may be connected by way of a system bus or other electrical communication paths. In one illustrative configuration, one or more central processing units ("CPUs") 1204 operate in conjunction with a chipset 1206. The CPUs 1204 may be standard programmable processors that perform arithmetic and logical operations necessary for the operation of the server computer 1102.

The CPUs 1204 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 may provide an interface to a RAM 1208, used as the main memory in the server computer 1102. The chipset 1206 may further provide an interface to a computer-readable storage medium such as a read-only memory ("ROM") 1210 or non-volatile RAM ("NVRAM") for storing basic routines that help to startup the server computer 1102 and to transfer information between the various components and devices. The ROM 1210 or NVRAM may also store other software components necessary for the operation of the server computer 1102 in accordance with the configurations described herein.

The server computer 1102 may operate in a networked environment using logical connections to remote computing devices and computer systems through a network, such as the LAN 1224 (or 1108). The chipset 1206 may include functionality for providing network connectivity through a NIC 1212, such as a gigabit Ethernet adapter. The NIC 1212 is capable of connecting the server computer 1102 to other computing devices over the LAN 1224. It should be appreciated that multiple NICs 1212 may be present in the server computer 1102, connecting the computer to other types of networks and remote computer systems.

The server computer 1102 may be connected to a storage device 1218 that provides non-volatile storage for the server computer 1102. The storage device 1218 may store an operating system 1220, programs 1222, and data, which have been described in greater detail herein. The storage device 1218 may be connected to the server computer 1102 through a storage controller 1214 connected to the chipset 1206. The storage device 1218 may consist of one or more physical storage units. The storage controller 1214 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 1102 may store data on the storage device 1218 by transforming the physical state of the physical storage units to reflect the information being stored. The specific transformation of physical state may depend on various factors, in different embodiments of this description. Examples of such factors may include, but are not limited to, the technology used to implement the physical storage units, whether the storage device 1218 is characterized as primary or secondary storage, and the like.

For example, the server computer 1102 may store information to the storage device 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 1102 may further read information from the storage device 1218 by detecting the physical states or characteristics of one or more particular locations within the physical storage units.

In addition to the mass storage device 1218 described above, the server computer 1102 may have access to other computer-readable storage media to store and retrieve information, such as program modules, data structures, or other data. It should be appreciated by those skilled in the art that computer-readable storage media is any available media that provides for the non-transitory storage of data and that may be accessed by the server computer 1102. In some examples, the operations performed by the network 100, and/or any components included therein, may be supported by one or more devices similar to server computer 1102. Stated otherwise, some or all of the operations performed by the network 100, and/or any components included therein, may be performed by one or more server computer 1102 operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 1218 may store an operating system 1220 utilized to control the operation of the server computer 1102. According to one embodiment, the operating system comprises the LINUX operating system. According to another embodiment, the operating system comprises the WINDOWS® SERVER operating system from MICROSOFT Corporation of Redmond, Washington. According to further embodiments, the operating system may comprise the UNIX operating system or one of its variants. It should be appreciated that other operating systems may also be utilized. The storage device 1218 may store other system or application programs and data utilized by the server computer 1102.

In one embodiment, the storage device 1218 or other computer-readable storage media is encoded with computer-executable instructions which, when loaded into the server computer 1102, transform the computer from a general-purpose computing system into a special-purpose computer capable of implementing the embodiments described herein. These computer-executable instructions transform the server computer 1102 by specifying how the CPUs 1204 transition between states, as described above. According to one embodiment, the server computer 1102 has access to computer-readable storage media storing computer-executable instructions which, when executed by the server computer 1102, perform the various processes described above with regard to FIGS. 7 and 8. The server computer 1102 may also include computer-readable storage media having instructions stored thereupon for performing any of the other computer-implemented operations described herein.

The server computer 1102 may also include one or more input/output controllers 1216 for receiving and processing input from a number of input devices, such as a keyboard, a mouse, a touchpad, a touch screen, an electronic stylus, or other type of input device. Similarly, an input/output controller 1216 may provide output to a display, such as a computer monitor, a flat-panel display, a digital projector, a printer, or other type of output device. It will be appreciated that the server computer 1102 might not include all of the components shown in FIG. 12, may include other components that are not explicitly shown in FIG. 12, or might utilize an architecture completely different than that shown in FIG. 12.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

CONCLUSION

The examples described herein provide a network may leverage the deep packet inspection capabilities provided by a service mesh to identify APIs in use within an organization. Furthermore, the present systems and methods may utilize third party resources (e.g., the third party services) to provide security insights and risk ratings of these APIs and specific API endpoint hosts. Thus, the present systems and methods provide for transparent or "frictionless" API redirection by not requiring an application to change its behavior nor any of the underlying mechanisms. The present systems and methods utilize existing mechanisms in a new way to achieve the present functionality rather than changing the application logic or code. Thus, from the perspective of the application, the application is not aware that there has been a change.

The present systems and methods reduce exposure to API threats while the API is being evaluated or assessed for risk and include DNS snooping, TTL modification, caching and interception of DNS queries and responses. Further, the present systems and methods redirect API calls dynamically and transparently to "safe" API endpoint hosts while maintaining application availability and functionality at least partially through caching the safe API endpoints, modifying TTL values, and intercepting new DNS requests. Still further, the present systems and methods react to changes in API risk assessments through TTL reduction, caching, and interception. Even still further, the present systems and methods further optimize reaction time for dynamic and transparent redirection of the API endpoint hosts using an API NAT-like process.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A non-transitory computer-readable medium storing instructions that, when executed, causes a processor to perform operations, comprising:
   with an intelligent domain name system (DNS) engine (IDE) associated with a containerized service within a pod of a mesh network:
      snooping a DNS query from the containerized service;
      identifying within the DNS query, an application program interface (API) endpoint name;
      snooping a DNS response associated with the DNS query;
      identifying an Internet protocol (IP) address associated with the API endpoint name and from the DNS response;
      transmitting the API endpoint name and the IP address to a controller;
      receiving, from the controller, a list of safe API endpoint hosts with no known security vulnerabilities based on security data obtained from at least one security service;
      caching, at the IDE, the list of safe API endpoint hosts including safe IP addresses;
      intercepting a subsequent DNS request from the containerized service; and
      transmitting to the containerized service, via the IDE, IP addresses of safe API endpoint hosts within the list of safe API endpoint hosts.

2. The non-transitory computer-readable medium of claim 1, the operations further comprising:
   reducing a default time-to-live (TTL) value of the DNS response to a minimum TTL value; and
   assigning the safe API endpoint hosts to a moderate TTL value less than the default TTL value and relatively higher than the minimum TTL value,
   wherein the moderate TTL value is based at least in part on a security risk of the safe API endpoint hosts being above a threshold.

3. The non-transitory computer-readable medium of claim 2, the operations further comprising:
   determining if the security risk of the API endpoint host has changed; and
   assigning a subsequent DNS query from the containerized service to the minimum TTL value based at least in part on the security risk of the API endpoint host having changed.

4. The non-transitory computer-readable medium of claim 3, wherein determining if the security risk of the API endpoint host has changed comprises:
   receiving, from the controller, an updated risk assessment from the at least one security service; and
   updating, at the IDE, at least one entry of the list of safe API endpoint hosts to reflect the updated risk assessment.

5. The non-transitory computer-readable medium of claim 1, the operations further comprising:
   swapping a destination IP address within a first IP packet header associated with the subsequent DNS request to a first API endpoint host with a second IP address within the list of safe API endpoint hosts including the safe IP addresses; and
   swapping a source IP address within a returning IP packet header with the second IP address.

6. The non-transitory computer-readable medium of claim 1, wherein the containerized service is a containerized application microservice within a Kubernetes pod.

7. The non-transitory computer-readable medium of claim 1, wherein the at least one security service comprises a security threat intelligence service, a DNS resolution service, a DNS lookup service, a phishing protection service, a content filtering service, a cloud computing security service, a security rating service, or combinations thereof.

8. A method of application program interface (API) endpoint host redirection, comprising:

with an intelligent domain name system (DNS) engine (IDE) associated with a containerized service within a pod of a mesh network:
snooping a DNS query from the containerized service;
identifying within the DNS query, an API endpoint name;
snooping a DNS response associated with the DNS query;
identifying an Internet protocol (IP) address associated with the API endpoint name and from the DNS response;
transmitting the API endpoint name and the IP address to a controller;
receiving, from the controller, a list of safe API endpoint hosts with no known security vulnerabilities based on security data obtained from at least one security service;
caching, at the IDE, the list of safe API endpoint hosts including safe IP addresses;
intercepting a subsequent DNS request from the containerized service; and
transmitting to the containerized service, via the IDE, IP addresses of safe API endpoint hosts within the list of safe API endpoint hosts.

9. The method of claim 8, further comprising:
reducing a default time-to-live (TTL) value of the DNS response to a minimum TTL value; and
assigning the safe API endpoint hosts to a moderate TTL value less than the default TTL value and relatively higher than the minimum TTL value,
wherein the moderate TTL value is based at least in part on a security risk of the safe API endpoint hosts being above a threshold.

10. The method of claim 9, further comprising:
determining if the security risk of the API endpoint host has changed; and
assigning a subsequent DNS query from the containerized service to the minimum TTL value based at least in part on the security risk of the API endpoint host having changed.

11. The method of claim 10, wherein determining if the security risk of the API endpoint host has changed comprises:
receiving, from the controller, an updated risk assessment from the at least one security service; and
updating, at the IDE, at least one entry of the list of safe API endpoint hosts to reflect the updated risk assessment.

12. The method of claim 8, further comprising:
swapping a destination IP address within a first IP packet header associated with the subsequent DNS request to a first API endpoint host with a second IP address within the list of safe API endpoint hosts including the safe IP addresses; and
swapping a source IP address within a returning IP packet header with the second IP address.

13. The method of claim 8, wherein the containerized service is a containerized application microservice within a Kubernetes pod.

14. The method of claim 8, wherein the at least one security service comprises a security threat intelligence service, a DNS resolution service, a DNS lookup service, a phishing protection service, a content filtering service, a cloud computing security service, a security rating service, or combinations thereof.

15. A system comprising:
a processor; and
a non-transitory computer-readable media storing instructions that, when executed by the processor, causes the processor to perform operations comprising:
with an intelligent domain name system (DNS) engine (IDE) associated with a containerized service within a pod of a mesh network:
snooping a DNS query from the containerized service;
identifying within the DNS query, an application program interface (API) endpoint name;
snooping a DNS response associated with the DNS query;
identifying an Internet protocol (IP) address associated with the API endpoint name and from the DNS response;
transmitting the API endpoint name and the IP address to a controller;
receiving, from the controller, a list of safe API endpoint hosts with no known security vulnerabilities based on security data obtained from at least one security service;
caching, at the IDE, the list of safe API endpoint hosts including safe IP addresses;
intercepting a subsequent DNS request from the containerized service; and
transmitting to the containerized service, via the IDE, IP addresses of safe API endpoint hosts within the list of safe API endpoint hosts.

16. The system of claim 15, the operations further comprising:
reducing a default time-to-live (TTL) value of the DNS response to a minimum TTL value; and
assigning the safe API endpoint hosts to a moderate TTL value less than the default TTL value and relatively higher than the minimum TTL value,
wherein the moderate TTL value is based at least in part on a security risk of the safe API endpoint hosts being above a threshold.

17. The system of claim 16, the operations further comprising:
determining if the security risk of the safe API endpoint hosts has changed; and
assigning a subsequent DNS query from the containerized service to the minimum TTL value based at least in part on the security risk of the safe API endpoint hosts having changed.

18. The system of claim 17, wherein determining if the security risk of the safe API endpoint hosts has changed comprises:
receiving, from the controller, an updated risk assessment from the at least one security service; and
updating, at the IDE, at least one entry of the list of safe API endpoint hosts to reflect the updated risk assessment.

19. The system of claim 15, wherein the containerized service is a containerized application microservice within a Kubernetes pod.

20. The system of claim 15, wherein the at least one security service comprises a security threat intelligence service, a DNS resolution service, a DNS lookup service, a phishing protection service, a content filtering service, a cloud computing security service, a security rating service, or combinations thereof.

* * * * *